Sept. 4, 1945.  A. LYSHOLM  2,383,979
INTERNAL-COMBUSTION MOTOR
Filed April 17, 1942   2 Sheets-Sheet 1

Patented Sept. 4, 1945

2,383,979

UNITED STATES PATENT OFFICE 2,383,979

INTERNAL-COMBUSTION MOTOR

Alf Lysholm, Stockholm, Sweden, assignor to Aktiebolaget Milo, Stockholm, Sweden, a corporation of Sweden Application April 17, 1942, Serial No. 439,300
In Sweden October 30, 1939

15 Claims. (Cl. 60—13)

This application is a continuation-in-part with respect to my copending application Serial No. 363,554 filed October 30, 1940, now abandoned.

The present invention relates to supercharged internal combustion engines and has particular reference to such engines in which fuel is supplied to the engine by means of fuel pumps delivering metered quantities of fuel, rather than by means of carburetors.

For the purpose of delivering a precompressed air supply to a supercharged engine, centrifugal and other forms of non-positive displacement blowers have been widely employed, but this type of apparatus is subject to two major deficiencies. The first is that with variations in speed and load on the engine, such devices are subject to fluctuating delivery pressure commonly referred to as "pumping." In the second place, the characteristics of non-positive displacement devices, such as centrifugal or axial rotary blowers, with respect to delivery pressure are undesirable for supercharging variable load engines, since the delivery pressure varies as the square of the speed of the blower. Consequently, particularly where the blower is geared to the engine and operates in definite relation to engine speed, the delivery or boost pressure falls off too rapidly for satisfactory operation at speeds materially below normal maximum engine speed.

The deficiencies of the non-displacement type of blower with respect to pumping and variations in delivery pressure with variations in speed are substantially overcome by compressors of the positive displacement type, but the advantages of the latter type of compressor cannot be wholly utilized to best advantage when such a unit is used as a supercharger for variable speed, variable load engines unless its inherent characteristics are modified. In the first place, modification of inherent characteristics is desirable in order to provide for desired variation in the admission pressure of the air delivered to the engine with variations in speed and load, particularly in order to provide for operation, without undue power absorption by the supercharger, under partial and low load conditions where it may be desirable for the engine to run not only without boost but with the admission pressure substantially below atmospheric. In the second place, modification of inherent characteristics is desirable for so controlling the operation of the supercharger and the supply of fuel to the engine as to enable the desired fuel air ratio suitable for different conditions of speed and load to be supplied, and particularly so as to enable desired variations in such ratio to be secured for the purpose of, for example, taking care of rapid acceleration, when an abnormally rich fuel mixture is required in order to secure optimum engine performance.

The general object of the present invention is therefore the provision of novel and improved means whereby, with a positive displacement type supercharging compressor optimum performance characteristics may be obtained, particularly with an engine to which fuel is supplied by a pump, both as to maximum power and acceleration characteristics and also as to fuel economy over the full normal speed and load ranges.

Other and more detailed objects of the invention will appear hereinafter as the following description of suitable forms of apparatus for carrying the invention into effect proceeds, reference being had to the accompanying drawings forming a part hereof.

Figure 1:
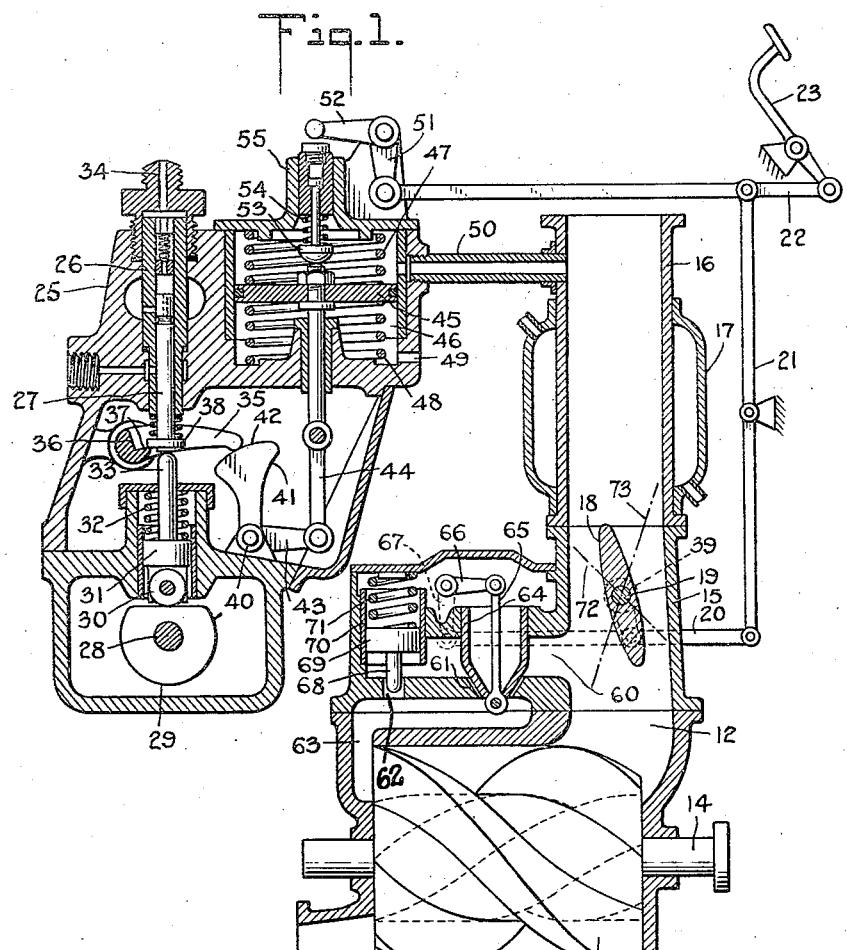
Fig. 1 is a more or less diagrammatic section, partly in elevation, of a fuel pump and compressor organization with associated control mechanism, embodying the principles of the invention.

Referring now more particularly to the form of apparatus illustrated in Fig. 1, 10 indicates a positive displacement compressor of the rotary screw wheel type having an inlet 11 and an outlet 12 for precompressed air. While the invention is not limited to any specific design of rotary displacement compressor, the compressor advantageously may be of the kind disclosed in U. S. Patent No. 2,243,874 granted to me June 3, 1941, and having a pair of intermeshing spiral lobed rotors, one of which is indicated at 14 in the drawings. Regardless of the specific design of compressor, it is characteristic of compressors of the rotary displacement type which are suitable for engine supercharging performance, that they be operated at relatively high rates of speeds of rotation in order to keep their bulk for a given capacity within reasonable limits relative to engine size. The high rotating speeds ordinarily employed require that the compressors be operated with so-called "space packing," that is, with small clearance between the relatively rotating parts through which there occurs a certain percentage of leakage. This leakage characteristic is common to devices of this general character whether they be of the compressor type disclosed in my patent above referred to or of the ordinary and well-known Roots blower type. This leakage characteristic is of some importance as will hereinafter be more fully explained.

In the apparatus shown, power for operating the compressor is delivered through shaft 14 which may be engine-driven through the medium of gears, with or without some form of variable speed coupling, or by a turbine actuated by exhaust gases from the engine. Through the medium of conduit 15, the outlet of the compressor is connected to the induction pipe 16 of the engine and intercooling of the compressed air may advantageously be effected through the medium of an intercooler diagrammatically indicated on the drawing by the jacket 17 through which a cooling medium, such as water, may be circulated.

A throttle valve 18 of the usual butterfly type is mounted in the conduit 15 on the pivot 19. A lever 39 attached to the throttle is connected by means of the linkage system comprising links 20, 21 and 22 to the engine control member, which in the embodiment illustrated has been indicated as a manually operable pedal 23. As will be apparent, the throttle valve is under the direct control of pedal 23, being moved toward full open position as the pedal is depressed and toward closed position as the pedal is retracted, to control the admission pressure of the air delivered to the engine.

A fuel pump indicated generally at 25 is provided for supplying fuel to the engine. The specific form of pump may vary within the scope of the present invention. For purposes of illustration the pump shown in Fig. 1 is of the usual reciprocating type having a plunger or piston 27 actuated through the medium of an engine-driven cam shaft 28 carrying cam 29, the latter acting on the roller tappet 30, 31 which is held in contact with the cam by means of the spring 32. The tappet 31 carries a pin 33 adapted to contact the lower end of the pump plunger 27 to actuate the latter on its discharge stroke. The length of the suction stroke of the pump plunger and consequently the delivery capacity of the pump per stroke is controlled by means of a lever 35 pivotally mounted to turn about a center 36 and having a projection or lip 37 located to contact the lower face of a flange 38 on plunger 27 to limit outward movement of the plunger under the influence of the plunger pump spring. At its outer or free end, the lever 35 contacts a cam surface 42 formed on the arm 41 of a pump controlling member in the form of a bell-crank pivoted at 40. Arm 43 of the bell-crank member is connected by means of a link 44 to a piston 45 located in a cylinder 46. Piston 45 is loaded on opposite sides by springs 47 and 48 which respectively bear against opposite sides of the piston and the opposite ends of the cylinder. The portion of the cylinder 46 in which spring 48 is located is vented to the atmosphere through vent port 49, and the portion of the cylinder in which the spring 47 is located is connected to the induction pipe of the engine by means of the pipe 50.

One arm 51 of a pivoted bell-crank member is connected by means of the link 22 to the control pedal 23. The other arm 52 of this bell-crank is located to contact and depress a plunger or plug 55 in the cover of cylinder 46. This plug member has mounted for relative axial movement therein a pin 53 located to contact the upper face of piston 45. Pin 53 is resiliently held in projected position by means of spring 54.

The conduit 15 provided with a branch 60 on the inlet side of throttle 18 and this branch is arranged to be placed in communication with a conduit 63 leading back to the intake side of the compressor, to form a bypass, by means of valve ports 61 and 62. Valve port 61 is arranged to be controlled by valve 64, which is connected by means of link 65 to one arm 66 of a bell-crank, the other arm 67 of which is connected with link 20 which also controls the position of throttle 18. The port 62 is controlled by a valve 68 attached to piston 69, sliding in a sleeve 70. The piston 69 is loaded by means of spring 71 which tends to close the valve and on its opposite face is exposed to pressure of the air in the branch 60 which tends to open the valve against the spring load.

First let it be assumed that the engine to which the above described mechanism is applied is to be employed for duty requiring wide variations in both load and speed, as for example, the power plant of an automotive vehicle. In order to get the maximum of power from the engine under full speed and full throttle conditions the engine is supercharged and the admission pressure under such conditions may be as high as two atmospheres absolute or one atmosphere boost, that is, the pressure above atmospheric. If now the engine is required to operate under part load conditions, it is evident that supercharging to the extent required to develop full power is not only unnecessary but actually wasteful of power because of the excess of power required to operate the supercharger. Under low load and idling conditions the undesirability of supercharging is even more pronounced, since under such conditions the engine can be operated much more efficiently as an aspirated engine in which the admission pressure of the air to the engine is below atmospheric. The present arrangement permits the highly desirable variation in admission pressure to be obtained under different load conditions very simply and contemplates engine operation in which boost will be supplied in the upper load range while in the lower load range the engine may operate without boost and with a depressed or suction inlet pressure. Also, the arrangement provides, in connection with this wide range of possible inlet pressures, a fuel control which will permit the fuel air ratio or mixture to be accurately controlled so as to provide for operation with high fuel economy over the entire load range, while at the same time, provision is made for varying the mixture ratio temporarily as occasion requires in order to provide the usual desired relatively rich mixture for acceleration purposes.

These various desirable characteristics of operation are afforded because of characteristics of the system which will now be more fully explained. Control of the amount of power developed by the engine is governed by the position of throttle 18 under the control of pedal 23. This throttle determines the amount of air delivered to the engine, and as indicated in the drawings, when the throttle is set to the angle indicated by the line 72, only sufficient air is supplied to permit of idling or low load operation. The line 73 indicates approximately full throttle position. In the drawings this position is shown slightly past the theoretical full open position which would be with the throttle parallel to the walls of the conduit 15. Slight movement to either side of the latter position has relatively no throttling effect on the air flowing past the valve and where the throttle is connected to other valve means the additional movement of the throttle is often advantageous in order to secure a greater range of movement for other mechanism interconnected with the throttle.

The amount of fuel supplied to the engine is dependent upon the length of stroke of the fuel pump. This in turn is determined by the position of the fuel pump control cam face 42, the position of which is governed by the position of the piston 45 in the cylinder 46. The position of piston 45 is in turn governed by the differential between atmospheric pressure and the pressure in the induction pipe 16, which may under different conditions of speed and load be either above or below atmospheric pressure. Thus the quantity of fuel supplied to the engine is determined indirectly from the control pedal 23 through the medium of admission pressure, the latter being directly controlled from the control 23 through the medium of the throttle 18. It therefore may be said that there is provided a primary control in which the quantity of fuel delivered to the engine is responsive to variations in the admission pressure of the air supplied to the engine. Disregarding for the moment the remaining control equipment, it will be apparent that as the throttle is moved to different positions corresponding to different values of load, the admission pressure of the air will vary and piston 45 will take different positions. This in turn will shift the position of the fuel control cam 42, the contour of which is made so that for given variations in admission pressure predetermined variations in the amount of fuel delivery will be effected so as to provide a proper fuel mixture for normal operation throughout the load range. The precise proportions of the mixture will vary with different kinds of engines and for different services and for different engines, the contour of the cam 42 may be different. Mixture requirements for desired character of engine performance are however well-known in the art and the selection of a proper contour for the cam 42 in any given instance is well within the skill of those familiar with this art.

It is well-known that for variable speed, variable load engines it is highly desirable to provide a richer mixture during periods of acceleration, particularly quick acceleration, than it is at other times when the engine is operating under more or less stabilized conditions. Under the latter conditions the primary object is to provide the leanest and most economical mixture which will produce adequate power. For acceleration, fuel economy becomes secondary in importance to performance and for this reason the mixture is desirably enriched to enable more rapid acceleration to be obtained than would be possible with the most economical mixture. In the present arrangement this is provided for by the spring loaded pin 53 which is adapted to be directly actuated by the control pedal 23. This operates as follows: Let it be assumed that the engine is operating at some intermediate speed and it is desired to accelerate it. To do this the throttle is opened, which will operate to increase the admission pressure. Increase in this pressure will tend to depress piston 45 and move the control cam 42 to provide for an increased fuel supply. If acceleration at only a relatively slow rate is desired, the normal mixture ratio will take care of the requirement and if this character of acceleration is made, the normal mixture ratio will not be interfered with. The reason for this is that to effect such acceleration the pedal 23 would be only gradually depressed, the throttle 18 would be opened and the resulting increase in the admission pressure would operate to depress piston 45 and move the cam 42 to provide for an increase in fuel supply corresponding to the increase in admission pressure. On the other hand, if rapid acceleration is desired, a quick enrichment of the mixture is desired. This is effected by the present arrangement due to the fact that to effect such acceleration the pedal 23 would be quickly depressed. This would again operate to open throttle 18 but if the rise in admission pressure resulting from this were entirely relied upon, the piston 45 would be moved only by an amount corresponding to the pressure rise, which would give no enrichment of the mixture above normal proportions. In this connection it must be remembered that there is a certain time lag in an indirect control system of the kind under discussion. In such a system, if the throttle is very suddenly opened, an appreciable length of time must elapse before equilibrium of the admission pressure corresponding to the opened position of the throttle occurs, and during this period the mixture is more likely to be made leaner rather than richer. In the present arrangement when the throttle is suddenly opened the link 22, operating through the bell-crank on the pin 53, serves to instantaneously depress piston 45 and move the fuel control cam 42. An increase in the fuel supply corresponding to the new pedal position is thus substantially instantaneously obtained. On the other hand, as noted above, there is a time lag before the condition of increased air admission corresponding to the new pedal position is obtained, and during that interval the normal mixture will be enriched. The increase in admission pressure at the end of the time lag period will have moved piston 45 down to a position corresponding to the new pedal position and there will then again have been established a condition of stabilized operation with normal fuel mixture. By this time however the desired acceleration to a higher speed will have been obtained.

It will thus be observed that in this arrangement there is a primary control effecting fuel consumption in accordance with admission pressure, which control system is associated with a second control system capable of and operating under certain conditions to overrule the first system. The first or primary system is generally operative during normal stabilized operation and during gradual transition from one stabilized condition to another. It is overruled during periods of quick acceleration since during such periods a mixture ratio different from that which the normal system would supply is provided.

The operation of the compressor or supercharger under different conditions of load and speed will now be considered, since the operating characteristics of the arrangement provided by the present invention are definitely related to and affect the results obtained by the remainder of the mechanism in so far as determination of fuel mixture is concerned.

As previously noted, rotary displacement compressors of the kind under consideration have a certain amount of leakage. This leakage is substantially a constant regardless of the speed of operation of the device. Consequently, the leakage becomes proportionately a constantly decreasing factor with increase in compressor speed, and vice versa, since the capacity is theoretically directly proportionate to speed. From this it follows that the volumetric efficiency of the device increases with increase in speed. This is readily illustrated by the fact that if at 100% capacity operation of the device the leakage amounts to 10% of the capacity, then at one-third of full speed capacity at the same pressure, the leakage will amount to 30%.

With the above considerations in mind let it be assumed that it is desired, as is usually the case, to provide an engine having as flat as possible a torque characteristic over a wide speed range. With the variations in leakage which occur with variations in speed, the delivery pressure from the compressor may well be undesirably low, at say half speed, if the compressor is chosen so that at full speed the desired delivery pressure is obtained. Consequently, it is often desirable to employ a compressor, the delivery characteristics of which are such as to produce the desired delivery pressure at for example half normal full speed. If such a compressor is employed, the delivery pressure would tend to rise to an undesirably high value at full speed, due to the constant rate of leakage. To compensate for this characteristic the valve 68 is provided, which by suitable choice of the loading provided by spring 71, will act as a maximum pressure or relief valve, coming into action during the high speed range of operation of the compressor to bypass a portion of the air to the compressor inlet and limit the admission pressure to which the air can be delivered to the engine.

In order for the apparatus to be fully effective, provision must be made not only for different conditions of speed but also for different conditions of load, as for example, for cases where it may be desired to maintain constant or substantially constant speed with different loads. This latter is a condition frequently met with in the case of a power plant for a vehicle such as a bus or truck. In the present arrangement, in order to provide such a control the valve 64 is employed, the functioning of which will be understood from the following. Let it be assumed that the engine is running at normal full speed under full load. In such case, the throttle will be in the position indicated by line 73 and the valve 64 will be fully closed instead of in the partially open position shown in the drawings. If now the load decreases and it is desired to prevent overspeeding of the engine, the throttle is moved towards closed position by proper manipulation of the pedal 23. During its movement from the position indicated by line 73 to the position shown in full lines in the drawing, throttle 18 will have little or no effect on the admission pressure of the air reaching the induction pipe 16 and acting on the piston 45 controlling the fuel supply. During this range of movement, however, the valve 64 will be increasingly opened by the action of the linkage interconnecting it and the throttle. As a result, some of the air delivered from the compressor will be bypassed back to the inlet and as a result the admission pressure will decrease, effecting an appropriate corresponding decrease in the amount of fuel supplied. Thus in the upper range of load control the control of the admission pressure will be through the medium of the bypass valve rather than the throttle valve. If the load is further reduced, further movement of the throttle from the position shown in the drawings toward the position indicated by line 72 will operate to throttle the air as delivered by the compressor so that there will be an appreciable pressure drop across the throttle valve. When such a condition occurs it is apparent that normal supercharging of the engine is no longer required and in fact no supercharging whatever may be required under such circumstances. It will be noted that as the throttle is moved through its effective throttling range towards the position corresponding to no load idling, the bypass valve 64 continues to be even further opened toward full open bypass position, thus further decreasing the pressure on the inlet side of the throttle valve. By the time the throttle is moved to or substantially to idling position, which can of course be accomplished only after the load has been reduced to or near no load, the throttling effect will ultimately reduce the speed of the engine and under such conditions the admission pressure in the pipe 16 may be substantially below atmospheric, the engine running then as an aspirated engine. Under such conditions the bypass valve 64 is substantially fully open and the compressor is also operating at relatively slow speed so that leakage within the compressor itself amounts to a relatively much higher proportion of the total volume of air handled than under normal load and speed operating conditions. Consequently, under such conditions the relatively inefficiently operating compressor absorbs substantially no power and may even require no actual mechanical power, or deliver a negative mechanical power. This may be understood, if consideration is given to the fact that under idling conditions the air requirements for the engine may be greater than the normal delivery capacity of the compressor at the low speed where the leakage is relatively high. Under such conditions a depressed pressure condition or suction may exist in the conduit 15 on the inlet side of the throttle valve and at the outlet of the compressor. If such condition exists, the pressure difference between the inlet pressure at atmospheric and the depressed outlet pressure will tend to turn the compressor in the direction in which it is normally driven by the power input shaft 14. In other words, the compressor may under such conditions tend to operate as a suction actuated motor. Since ordinarily there is substantial throttling resistance through the bypass valve 64, the air flow from the inlet through the bypass to the throttle valve may well be insufficient to equalize the difference in pressure between the inlet and the outlet of the compressor.

From the foregoing description it is believed it will be evident that the arrangement provided is effective to provide for desired regulation both as to speed and load, through a range of admission pressures sufficiently wide for an engine which at idling operates without supercharging and which under normal full load conditions operates as a highly supercharged engine, all of this being accomplished with accompanying mixture regulation insuring proper mixture proportions under all conditions.

The above described arrangement is particularly suitable for use in connection with supercharged engines operating with a so-called partial charging cycle in which the compression ratio obtained in the engine cylinder is substantially less than the expansion ratio, as disclosed in my Patent No. 2,292,233 issued August 4, 1942

In the foregoing discussion of operation of the apparatus shown in Fig. 1 it has been assumed that the compressor is driven through engine gears at a speed proportional to engine speeds. In many instances it is desirable in order to utilize what would otherwise be waste energy, to drive the compressor by means of an exhaust gas turbine operated by exhaust gas from the engine. In such installations the speed of the compressor is not necessarily proportional to engine speed and in fact it rarely is. With an exhaust gas driven supercharger the speed is determined by the volume and temperature of the exhaust gases available and these factors are dependent upon both speed and load.

The arrangement shown in Fig. 1 is applicable to turbine driven compressors as well as engine gear driven compressors and if the compressor is driven by an exhaust gas turbine the control mechanism which overrules the primary fuel control is of even greater importance. The reason for this is that with an exhaust gas driven compressor the time lag between opening of the throttle to increase the power delivered by the engine and the time when increased admission pressure is obtained from the turbine, is greater than in the case of an engine gear driven compressor. In the case of the exhaust gas driven compressor, not only must the engine speed increase to increase the volume of exhaust gas available, before the compressor speed can be increased to increase the admission pressure, but in addition the inertia of the compressor and turbine must be overcome and the speed of this unit accelerated. Thus, it is evident that with an exhaust gas driven compressor there is greater time lag between throttle opening and increase of admission pressure to that corresponding to the new position of the throttle than in the case of the engine gear driven compressor. With this greater time lag the leaning of the mixture during the transition period of acceleration would be aggravated and the need for the overruling control system to provide a proper mixture for this period is even more pronounced.

Aside from the added time lag introduced by exhaust gas turbine drive instead of gear drive, the operating characteristics of the compressor in relation to the requirements of the engine for air at different pressures under different conditions will be in general the same as previously discussed and need not further be explained. One difference between exhaust gas and gear driven arrangements, relating to the safety factor rather than difference in control, may however be noted. In the case of the gear driven compressor some form of bypass valve should be provided in order to avoid risk of damaging a compressor or piping due to excess pressure under conditions where for instance the engine might be turning at relatively high speed with the throttle subtsantially closed. In other words, a semi-racing condition under no load. On the other hand, with an exhaust gas driven compressor, the substantially closed throttle position corresponding to no load will result in the production of such a small amount of energy in the exhaust gases that the compressor speed will necessarily be reduced to a very low value and at such very low speed the leakage factor in the compressor would alone be sufficient to prevent dangerously high pressures from being developed between the compressor and the substantially closed throttle.

Figure 2:
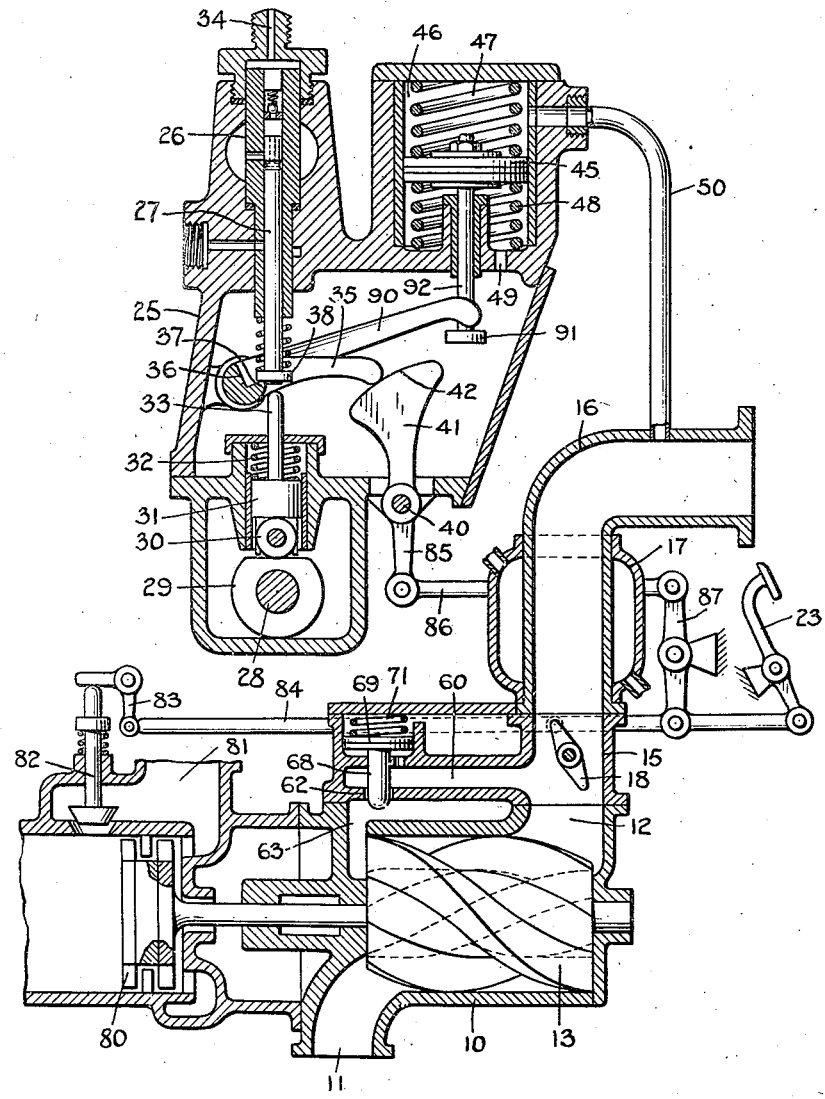
Fig. 2 is a similar view showing another form of mechanism embodying the invention.

Referring now to the arrangement illustrated in Fig. 2, the compressor is in this instance driven by an exhaust gas turbine 80 to which exhaust gases from the engine are admitted through the conduit 81. A spring loaded bypass valve 82 is provided for bypassing exhaust gas around the turbine, this valve being connected to the control pedal 23 by means of link 84 and bell-crank 83. The link 84 also controls the throttle 18 and as will be evident from the drawing, movement of pedal 23 to open the throttle will also operate to close the bypass valve 82 against the spring load which normally tends to keep this valve open. In this arrangement the by-pass valve 82 takes the place of the valve 64 in the arrangement shown in Fig. 1 and consequently in the present instance the branch 60 is provided only with the relief valve 68.

In the present arrangement the member carrying the pump regulating cam 42 is connected by means of lever arm 85 and link 86, lever 87 and link 84 to the control pedal, the linkage being arranged so that movement of the pedal to open the throttle operates to permit the pump control lever 35 to move downwardly and lengthen the pump stroke. A second lever 90 is rigidly connected to turn with lever 35. The free end of lever 90 is located so that it can bear under certain conditions against the upper face of a flange 91 formed on the lower end of the piston rod 92 connected to piston 45. In other respects the arrangement is similar to that previously described.

The operation of this arrangement is as follows. Let it be assumed that the engine is operating at a stabilized partial load, say, half load. If now the load increases and it is desired to compensate for the increase so as to maintain engine speed, depression of the control pedal will operate to positively and directly move both the throttle and the fuel control cam to provide for increased air admission pressure and fuel supply. At the same time the partially open bypass valve 82 will be moved toward closed position to cause a larger proportion of the exhaust gases to pass through the turbine and increase its speed for the purpose of providing the additional air required for the increased load on the engine. This control system forms the primary control but in order to secure optimum operation this system requires the use of a second system which under certain conditions will overrule the first system in order to provide the desired proper mixture for the special condition. As noted in connection with the description of the apparatus shown in Fig. 1, it is desirable to enrich the mixture during periods of rapid acceleration. With the arrangement shown in Fig. 1, modifictaion of the primary control system by a second and overruling system is required in order to avoid too lean a mixture during periods of quick acceleration. In the present arrangement an overruling system is required but for the opposite reason. In the present arrangement if it were not for the overruling system provided, an overrich mixture might be supplied during periods of rapid acceleration. The reason for this is due to the greater time lag which may occur with an exhaust gas driven compressor. If as above assumed, the control pedal 23 is moved suddenly for a quick acceleration there will be an instantaneous increase in the amount of fuel supplied. However, even though the bypass valve 82 is at the same time moved toward closed position, a very appreciable length of time is required for the turbine and compressor inertia to be overcome and for the compressor to supply more air due to the increased compressor speed. Consequently, the condition may arise where even though the throttle is opened simultaneously with the increasing of the fuel supply the compressor will be unable to supply sufficient additional air to prevent the mixture from becoming overrich even for acceleration. In Fig. 2 the parts are shown in a position corresponding to a stabilized condition of operation and it will be noted that under such conditions the lever 90 is not in contact with the flange 91 but is spaced therefrom so as to have a certain amount of lost motion or play before contact is established. This permits instantaneous adjustment of the fuel pump to provide for immediate increase in fuel to the engine when the control cam 42 is shifted and this will operate to enrich the mixture for acceleration purposes even if at the same time the throttle 18 is opened, since under any circumstances, increase in amount of fuel delivered upon actuation of the control will be more rapid than increase in the amount of air supplied. Because of the time lag introduced by the inertia of the turbine driven compressor, the increase in admission pressure to the engine would normally lag so far behind increased fuel supply that an excessively rich mixture would result. In the present arrangement however this is avoided, since if due to such lag the admission pressure in the admission pipe 46 has not been sufficiently built up to avoid an overrich mixture, the movement of piston 45 due to such increase will be insufficient to move the flange 91 out of the way of lever 90. Under such conditions, after the lost motion provided by the clearance between these two members has been taken up, which will operate to enrich the mixture somewhat above normal, further lengthening of the pump stroke will be halted until the admission pressure has been built up sufficiently to move the flange 91 downwardly to an extent enabling the levers 90 and 35 to drop to a position in which the lever 35 is again in contact with the cam 42. Thus in this instance, the pressure responsive system constitutes the second system operating to overrule the first system. The function in this case is the same as that shown in the arrangement shown in Fig. 1, which is to provide for a proper mixture during periods of rapid acceleration, which otherwise might not be obtained.

It is to be noted that in both cases, if the lag or other inherent characteristics of the primary system are not such as to result in the production of an undesirable mixture under any given set of conditions the second or overruling system will not come into action, the overruling system automatically coming into play in each instance only to prevent establishment of a setting which would operate to give an undesired abnormal mixture ratio.

It is believed it will be evident that the valve 68, operating to prevent excessive pressures at high operating speeds, will function in the same fashion in both of the arrangements described.

Also it is believed that it will be largely evident how the bypass valve 82 will operate to reduce compressor speeds at partial loads by bypassing progressively greater quantities of exhaust gas as the throttle is moved toward closed position. In the lower load range with the engine relatively highly throttled, the available energy in the exhaust gases is relatively little and this, combined with the opening of the bypass valve 82, may result in insufficient energy being admitted to the turbine to enable it to operate the compressor. This, however, is of no particular moment since under the conditions assumed, the engine would be running as an aspirated rather than as a supercharged engine, and as previously explained the air necessary for operation of the engine is obtainable by virtue of the fact that the pressure difference occurring between the inlet and the outlet of the compressor will enable it to turn idly as a suction operated motor.

In some instances, as for example in cases where the compressor is used to supercharge aviation engines which must operate at very high altitudes, relatively high compression ratios in the supercharger will be desirable because of the very wide variation in inlet pressure as between operation at ground level and operation at high altitude. In such cases where high compression ratio within the compressor is provided, a further control for the compressor may be desirable, particularly in cases where the compressor is exhaust gas driven rather than gear driven.

If a supercharger with high compression ratio is employed with gear drive and with the control arrangement as shown in Fig. 1, unnecessary work of compression will be done at part load operation even with the bypass valve 64 operating to provide proper admission pressure to the engine. The reason for this is of course that the air will be compressed to substantially higher pressure within the compressor before it is delivered from the outlet 12 than the pressure at which it is utilized in the engine. Such excess pressure represents useless work, which is of course undesirable.

In the case of an exhaust gas driven supercharger with a high compression ratio, a lag of highly undesirable length in the time required to speed up the compressor from a condition of operation at no load may result from the necessity for compressing to a relatively high pressure in the compressor even when such high pressure is not required as the admission pressure to the engine. Thus if the supercharger is operating under a condition where supercharged admission is not required and relatively little exhaust gas energy is available, compression to the high compression ratio must be effected, if the supercharger is operated, regardless of the operating conditions. The compressor will not be operated by the turbine until sufficient exhaust gas energy is available to enable the turbine to drive the compressor with the latter doing the work required to compress to the normal high ratio and under certain conditions such operation might require doing unnecessary work.

Figure 3:
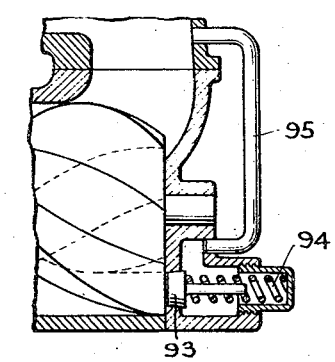
Fig. 3 is a fragmentary view diagrammatically illustrating an additional compressor control adapted to provide for variable compression ratio operation.

Consequently, and particularly for aircraft installations where high compression ratios are desirable, means may be desired which will operate to afford what is in effect a variable compression ratio and in Fig. 3, I have illustrated more or less diagrammatically an arrangement suitable for application to either of the organizations shown in Figs. 1 and 2 and more particularly advantageous for use with a high compression ratio exhaust gas driven compressor. In this arrangement the discharge end of the compressor 10 is provided with one or more bypass valves, one such valve being shown at 93, spring loaded by means of spring 94. The outlet side of valve 93 is connected by means of a relief conduit 95 which opens into the discharge side of the compressor so that the valve is subjected to the pressure differential between the compression pressure developed in the working chambers in the compressor and the pressure in the delivery conduit. Spring 94 biases the valve toward closed position so that it will open only after a certain differential pressure has been established. This spring load may be relatively light.

With this arrangement it will be apparent that if for any reason, due either to an open bypass such as valve 64 in the arrangement shown in Fig. 1, or to low speed low load operating conditions resulting in relatively slow speed operation of the compressor in the case of an exhaust gas driven installation, the admission pressure to the engine is materially below the compression pressure established in the compressor, the valve 93 will open when the compression pressure in the working chambers of the compressor reaches a value only slight above that existing in the delivery conduit. This in effect provides a variable compression ratio in the compressor which operates to prevent the compressor from having to do excess work and which further permits the compressor to readily be speeded up, with increasing compression ratio from a low value, when demand for increasing delivery with increasing boost occurs at a time when the apparatus may be operating under idling or low load conditions.

From the foregoing description it will be apparent that many changes and variations in the specific arrangements herein described by way of example may be made without departing from the spirit of the invention or the scope thereof as defined in the appended claims.

Certain subject matter relating to compressor construction per se, divided out of this application, is claimed in my copending application Serial No. 499,467, filed August 21, 1943.

What I claim is:

1. The combination, with an internal combustion engine having an induction conduit, a throttle valve for controlling flow through said conduit and a regulable fuel supplying device for supplying metered quantities of fuel to the engine of a first control means for controlling the quantity of fuel delivered by said device in response to variations in the pressure in said conduit on the engine side of said throttle valve and a second control means for controlling the quantity of fuel delivered by said device and the position of said throttle, one of said control means operating as the primary control for governing the fuel mixture during periods of stabilized engine operation and the other of said control means operating to initially overrule said primary control means upon quick opening of said throttle and thereafter permit said primary control means to assume control, whereby to insure proper mixture control during periods of quick acceleration resulting from said quick throttle opening.

2. Apparatus according to claim 1 in which said first control means constitutes said primary control.

3. Apparatus according to claim 1 in which said second control means constitutes said primary control and in which said first control means overrules said second control means only with respect to said fuel supplying device.

4. The combination, with an internal combustion engine having an air induction conduit, a throttle valve in said conduit and a regulable fuel supplying device for supplying metered quantities of fuel to the engine, of a positive displacement compressor for delivering air under pressure to said throttle valve, a first control means responsive to variations in the pressure in said conduit on the engine side of said throttle for regulating said device, a second control means for regulating said device and said throttle, one of said control means operating as the primary control for governing the fuel mixture during periods of stabilized engine operation and the other of said control means operating to overrule said primary control means during quick acceleration periods to insure proper mixture control during such periods of acceleration, and a control valve operative to govern the amount of air delivered by said compressor to said throttle valve, said control valve being operated by said second control means.

5. Apparatus according to claim 4 in which said first control means constitutes said primary control.

6. Apparatus according to claim 4 in which said second control means constitutes said primary control.

7. Apparatus according to claim 4 in which said compressor is engine driven and in which said control valve controls a bypass for bypassing air delivered by said compressor from a place on the inlet side of said throttle valve to the inlet side of the compressor.

8. Apparatus according to claim 4 in which said compressor is driven by an exhaust gas turbine operated by exhaust gas from said engine and said control valve controls the proportion of the momentarily available exhaust gas delivered to the turbine.

9. Apparatus according to claim 4 in which a spring loaded bypass valve controls a bypass connecting a place located between said compressor and said throttle valve with the inlet side of the compressor.

10. Apparatus according to claim 4 in which said compressor is of the rotary space packed type having a substantially constant leakage characteristic due to said space packing.

11. Apparatus according to claim 4 in which the compressor is of the rotary type and includes means providing for a variable compression ratio in the compressor.

12. Apparatus according to claim 4 in which the compressor is of the rotary type provided with means operative in response to the pressure in the zone between the outlet side of the compressor and said throttle valve for varying the compression ratio developed within the compressor.

13. The combination, with an internal combustion engine having an air induction conduit, a throttle valve in said conduit and a fuel supplying device, of a positive displacement rotary compressor for delivering air under pressure to said throttle valve, means for actuating said throttle valve to control the engine, valve means for controlling the delivery of air to said throttle by said compressor and actuating means interconnecting the two last mentioned means, said actuating means being arranged so that in the upper portion of the load range of operation the quantity and induction pressure of the air is governed substantially by the operation of said compressor and in the lower load range of operation of the engine the quantity and pressure of the air admitted to the engine are controlled substantially by said throttle.

14. Apparatus according to claim 13 in which the compressor is provided with space packing giving a substantially constant leakage characteristic.

15. Apparatus according to claim 13 in which the compressor is provided with means responsive to variations in air pressure between the outlet in the compressor and said throttle valve for varying the compression ratio developed within the compressor.

ALF LYSHOLM.